US008052316B2

(12) United States Patent  (10) Patent No.: US 8,052,316 B2
Lee  (45) Date of Patent: Nov. 8, 2011

(54) LIGHTING DEVICE AND DISPLAY DEVICE EMPLOYING THE SAME

(75) Inventor: Young-chol Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 11/781,284

(22) Filed: Jul. 23, 2007

(65) Prior Publication Data

US 2008/0025043 A1  Jan. 31, 2008

(30) Foreign Application Priority Data

Jul. 26, 2006 (KR) .................. 10-2006-0070295

(51) Int. Cl.
*F21V 7/04* (2006.01)
(52) U.S. Cl. ........ 362/610; 362/612; 362/613; 362/616; 362/625
(58) Field of Classification Search .................. 362/610, 362/612–613, 616, 621, 623, 625, 628
See application file for complete search history.

(56) References Cited

U.S. PATENT DOCUMENTS

| 6,749,311 | B2 * | 6/2004 | Suzuki et al. ................. 362/610 |
| 6,917,456 | B2 * | 7/2005 | Reboa et al. .................. 359/253 |
| 7,261,453 | B2 * | 8/2007 | Morejon et al. .............. 362/555 |
| 2002/0071267 | A1 * | 6/2002 | Lekson et al. ................. 362/31 |

FOREIGN PATENT DOCUMENTS

| CN | 1195118 A | 10/1998 |
| CN | 1484089 A | 3/2004 |
| JP | 2002-260428 B2 | 9/2002 |

* cited by examiner

*Primary Examiner* — Diane Lee
*Assistant Examiner* — Sean Gramling
(74) *Attorney, Agent, or Firm* — Sughrue Mion, PLLC

(57) ABSTRACT

A lighting device and a display device are provided. The lighting device includes: a light source; a light dividing member; and a beam shaper. The light dividing member includes a light receiving surface, on which light is incident, and divides the incident light into a plurality of light beam groups each having a predetermined width and interval therebetween. The beam shaper is disposed between the light source and the light dividing member. Light from the light source is incident on the beam shaper, and light emitted form the beam shaper is parallel and has a cross-sectional shape corresponding to the shape of the light receiving surface of the light dividing member.

17 Claims, 7 Drawing Sheets

LIGHTING DEVICE AND DISPLAY DEVICE EMPLOYING THE SAME

CROSS-REFERENCE TO RELATED PATENT APPLICATIONS

This application claims priority from Korean Patent Application No. 10-2006-0070295, filed on Jul. 26, 2006, in the Korean Intellectual Property Office, the disclosure of which is incorporated herein in its entirety by reference.

BACKGROUND OF THE INVENTION

1. Field of the Invention

Apparatuses consistent with the present invention relate to a lighting device which divides light into a plurality of monochromatic light beams, such that each beam corresponds to a pixel and a display device which employs the lighting device and has improved light usage efficiency.

2. Description of the Related Art

Flat panel displays are classified as emissive displays, which form images by emitting light themselves, or as non-emissive displays, which form images by receiving light from an external source. For example, a non-emissive flat panel display device such as a liquid crystal display (LCD) requires an additional light source such as a backlight unit.

Since non-emissive flat panel display devices cannot use all the light emitted by the light source efficiently, they have low light usage efficiency.

For example, LCDs are manufactured by injecting liquid crystal material between substrates on which electrodes are disposed. Liquid crystal molecules of the liquid crystal material are moved by an electric field generated by applying a voltage between two electrodes, and thus, an image can be displayed by altering the transmissivity of light according to a state of the liquid crystal molecule. The liquid crystal layer within an LCD acts as a shutter to block or transmit polarized light, as the polarization properties of the liquid crystal layer are altered based on the voltage applied between the electrodes. Polarization plates are formed on both surfaces of the LCD. Since the polarization plates formed on both surfaces of the LCD transmit light polarized in one direction and absorbs light polarized in other directions, they are absorbing polarization plates. The absorbing polarization plates absorb about 50% of the emissive light, and therefore, an LCD employing the same has a low light efficiency.

In order to realize a color image, an LCD includes Red (R), Green (G) and Blue (B) color filters. The color filters are formed using dyes and pigments. Each color filter only transmits light corresponding to a color having a corresponding wavelength. Thus, they each absorb ⅔ of the light incident thereon, which provides another source of low light efficiency.

SUMMARY OF THE INVENTION

The present invention provides a lighting device which divides light into a plurality of light beams each corresponding to a pixel, and a display device which employs the lighting device to have improved high light usage efficiency.

According to an aspect of the present invention, there is provided a lighting device comprising: a light source; a light dividing member; and a beam shaper, the light dividing member comprises a light receiving surface on which light is incident, and divides the incident light into a plurality of light beam groups each having a predetermined width and a predetermined interval therebetween. The beam shaper is disposed between the light source and the light dividing member. Light from the light source is incident on the beam shaper, and light emitted from the beam shaper is parallel and has a cross-sectional shape corresponding to a shape of the light receiving surface.

According to another aspect of the present invention, there is provided a lighting device comprising: first, second, and third light sources which each emit monochromatic light in a parallel direction, wherein the light emitted from the first, second, and third light sources are different colors the device further comprises first, second, and third beam shapers corresponding to the first, second, and third light sources, respectively, wherein the light from the first, second, and third light sources are incident, respectively, on the first, second, and third beam shapers, and light emitted from the first, second, and third beam shapers is parallel and has a predetermined cross-sectional shape to emit. Each of the beam dividing members includes a light receiving surface having a shape corresponding the cross-sectional shape of the light emitted from the beam shapers. Each beam dividing member divides the monochromatic light incident thereon into a plurality of monochromatic light beam groups having a predetermined width and interval therebetween. The plurality of monochromatic beam groups of the beam dividing members are emitted from the beam dividing members in an alternating, repeating pattern.

According to another aspect of the present invention, there is provided A display device comprising: a lighting device as described above. The display device also includes a light guide plate which guides light emitted from the lighting device; a light modulator, disposed on the light guide plate, which is controlled per pixel so that light transmitted inside of the light guide plate is emitted to an upper part of the light guide plate or is total-reflected to an lower part of the light guide plate.

BRIEF DESCRIPTION OF THE DRAWINGS

The above and other exemplary aspects of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
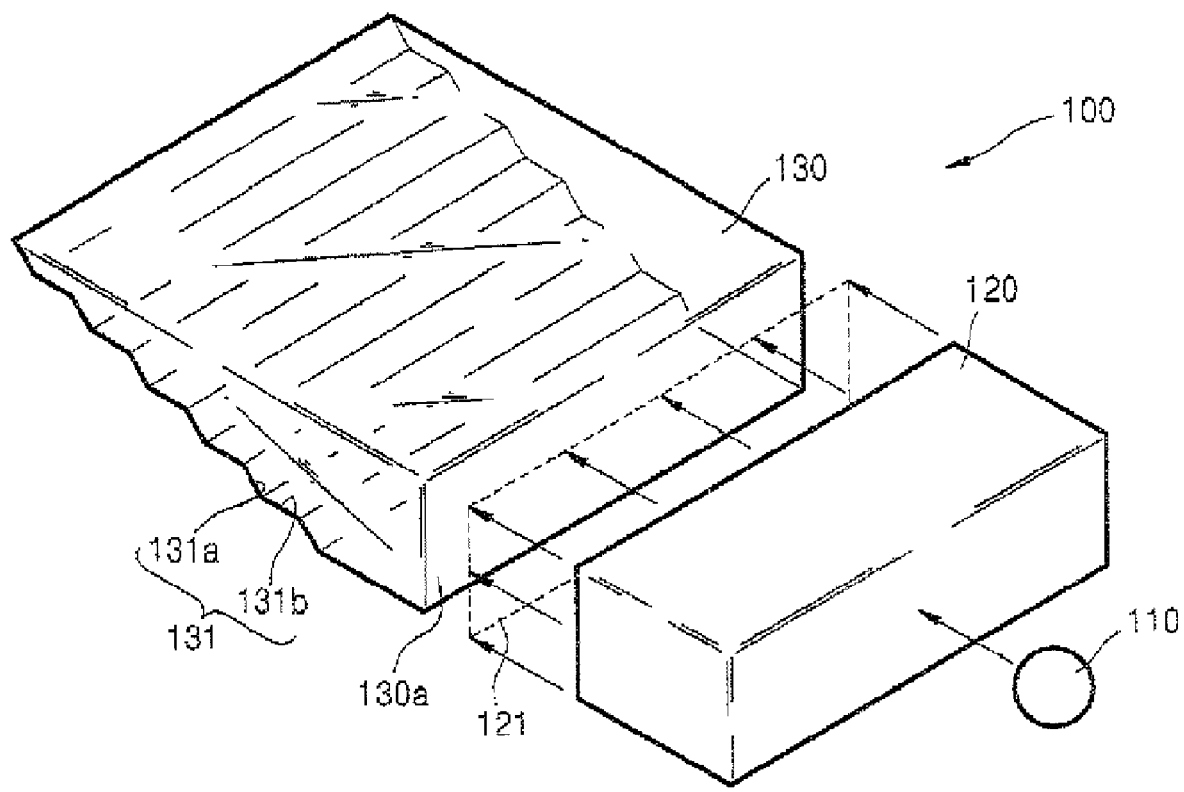
FIG. 1 is a schematic perspective view illustrating a lighting device according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will not be repeated. In the drawings, the thickness of layers and region are exaggerated for clarity.

FIG. 1 is a schematic perspective view illustrating a lighting device according to an embodiment of the present invention. Referring to FIG. 1, the lighting device 100 includes a light source 110, a beam shaper 120 and a light dividing member 130. The light source 110 may be a light emitting diode (LED), a laser light source, or the like. The beam shaper 120 shapes light emitted from the light source 110 to emit parallel light having a predetermined cross-sectional shape. The beam shaper 120 may include a diffractive optical element (DOE), a cylinder lens, a Fresnel lens, or the like, but it is not limited thereto. That is, the beam shaper 120 may include any element or elements which can shape incident to emit parallel light having a predetermined cross-sectional shape 121. The emitted light is transmitted to the light dividing member 130. The light dividing member 130 divides the light into a plurality of light beam groups, where the light beam groups have a predetermined width and interval therebetween. To achieve this, the light dividing member 130 includes a light receiving surface 130a, on which light is incident, and a plurality of light dividing units 131 which divide the incident light into the plurality of light beam groups. The light receiving surface 130a corresponds to the cross-sectional shape 121 of the parallel light. Each light dividing unit 131 includes an inclined surface 131a, which reflects the light incident thereon, and a flat surface 131b, which is parallel with the parallel light incident on the light receiving surface 130a of the light dividing member 130. The plurality of light dividing units 131 have a repeating stepped shape. Each inclined surface 131a is inclined at a predetermined slope with respect to the flat surfaces 131b. The inclined surfaces 131a may be formed so that the light incident on the inclined surfaces 131a is totally reflected. In particular, the inclined surfaces 131a may incline at a slope such that the light incident on an inclined surfaces 131a and the light reflected therefrom are perpendicular to each other. The flat surfaces 131b are parallel with the parallel light incident on the light receiving surface 130a. The light is divided according to the number of light dividing units 131 of the light dividing member 130. The number of light dividing units 131 may be determined accordingly.

Figure 2:
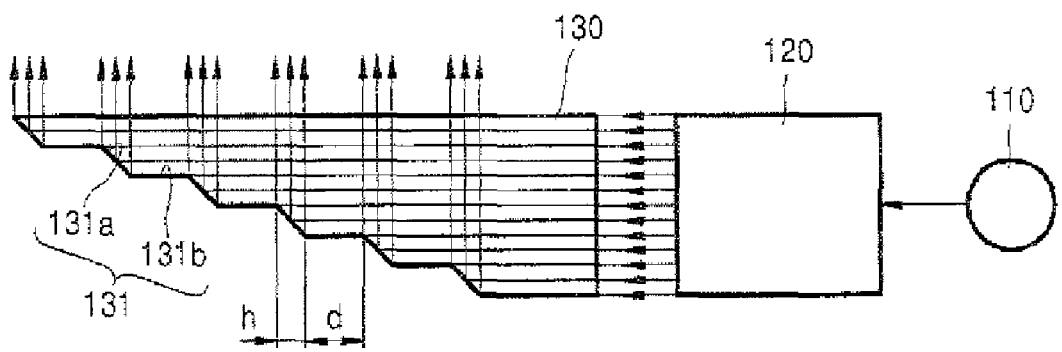
FIG. 2 is a cross sectional view illustrating the paths of light divided into a plurality of light beam groups by the lighting device of FIG. 1.

FIG. 2 is a cross sectional view of the light device 100, illustrating the paths into which the light is divided as a plurality of light beam groups, having a predetermined width and a predetermined interval therebetween, by the light dividing member 130 of FIG. 1. Referring to FIGS. 1 and 2, when the light, which is incident on the light dividing member 130, is incident on the inclined surface 131a, the path of the light is altered. The plurality of inclined surfaces 131a and the plurality of flat surfaces 131b are formed one after the other. Therefore, a distance between light beam groups reflected from the inclined surfaces 131a is an interval corresponding to a length d of the flat surfaces 131b. A width of the reflected light beam group corresponds to a horizontal length h of the inclined surfaces 131a, that is, a length at which each inclined surface 131a is projected onto a surface parallel with the flat surfaces 131b. The number of light beam groups into which the light is divided is the same as the number of inclined surfaces 131a. As illustrated in FIG. 2, when the number of inclined surfaces 131a is six, the light is divided into six light beam groups which are output from the light dividing member.

Figure 3:
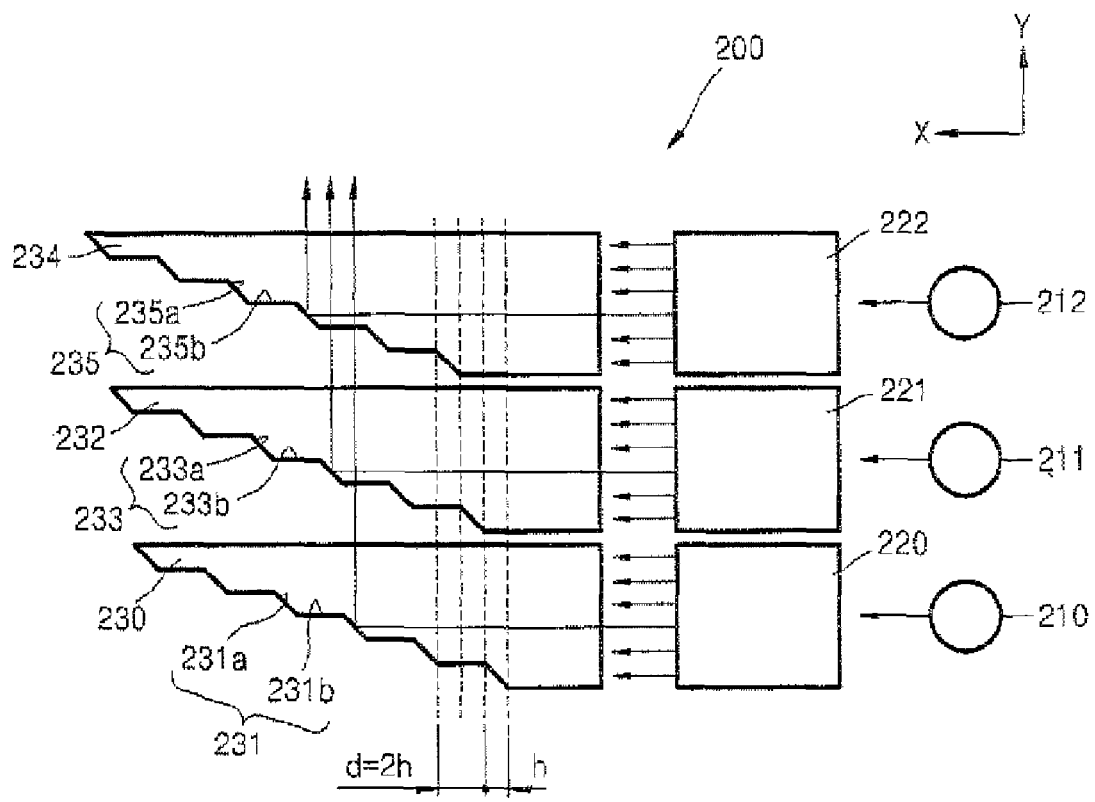
FIG. 3 is a perspective schematic view illustrating a lighting device according to another exemplary embodiment of the present invention.

FIG. 3 is a perspective schematic view illustrating a lighting device according to another embodiment of the present invention. Referring to FIG. 3, a lighting device 200 includes first, second and third light sources 210, 211 and 212; first, second and third beam shapers 220, 221 and 222; and first, second and third light dividing members 230, 232 and 234.

The first, second and third light sources 210, 211 and 212 are monochromatic light sources, for example, which may be light emitting diodes, laser light sources, or a device which can emit red, green and blue light. The first, second and third light sources 210, 211 and 212 are each a monochromatic light sources which emit a red light beam group R, a green light beam group G and a blue light beam group B, respectively.

The first, second and third light sources 210, 211 and 212 are disposed in a line, and they emit the red light beam group R, the green light beam group G and the blue light beam group B in a the same direction. The first, second and third beam shapers 220, 221 and 222 are disposed on the paths of light emitted from the first, second and third light sources 210, 211 and 212, respectively. The first, second and third beam shapers 220, 221 and 222 shape light emitted from the first, second and third light sources 210, 211 and 212 to emit parallel light having a predetermined cross-sectional shape. Each of the first, second and third beam shapers 220, 221 and 222 may include a DOE, a cylinder lens, a fresnel lens, or the like. The first, second and third light dividing members 230, 232 and 234 are disposed on the paths of light emitted from the first, second and third beam shapers 220, 221 and 222, respectively. The first, second and third light dividing members 230, 232 and 234 are disposed in parallel so that light emitted from the first, second and third beam shapers 220, 221 and 222 is emitted in the same direction. As illustrated in FIG. 3, the first, second and third light dividing members 230, 232 and 234 are sequentially disposed in parallel along a Y direction. Light emitted from the first, second and third beam shapers 220, 221 and 222 is emitted to the first, second and third light dividing members 230, 232 and 234 along an X direction. The constructions and operations of the first, second and third light dividing members 230, 232 and 234 are equivalent to those of the light dividing member 130. However, the specific construction of the first, second and third light dividing members 230, 232 and 234 is determined so that the plurality of light beam groups into which the light is divided by the first, second and third light dividing members 230, 232 and 234 is such that a red light beam group, a green light beam group and a blue light beam group are sequentially disposed in a repeating pattern.

The first light dividing member 230 includes a plurality of light dividing units 231. Each light dividing unit 231 is composed of an inclined surface 231a, reflecting incident light, and a flat surface 231b, formed in parallel with the light incident on the first light dividing member 230. The plurality of inclined surfaces 231a and a plurality of flat surfaces 231b have a repeating, stepped shape. The inclined surfaces 231a are inclined at a predetermined slope with respect to the flat surfaces 231b. The inclined surfaces 231a may be formed so that the light incident on the inclined surfaces 231a is totally-reflected. In particular, the inclined surfaces 231a may incline at a slope at which the light incident thereon and the light reflected thereby are perpendicular to each other. The flat surfaces 231b are parallel with the light emitted by the first beam shaper 220 and incident on the first light dividing member 230. The length d is twice as long as a horizontal length h of the inclined surface 231a. The horizontal length h is a length defined by an inclined surface 231a projected onto a surface parallel with the flat surfaces 231b, and it is a length measured in an X direction.

The second and third light dividing members 232 and 234 respectively include a plurality of second light dividing units 233 and a plurality of third light dividing units 235. The second and third light dividing units 233 and 235 are respectively composed of inclined surfaces 233a and 235b, reflecting the light incident thereon, and flat surfaces 233b and 235b formed to be parallel with parallel light emitted from the second and third beam shapers 221 and 222. The inclined surfaces 233a and 235b and the flat surfaces 233b and 235b have a repeating, stepped shape. The inclined surfaces 233a and 235b are inclined at a predetermined slope with respect to the flat surfaces 233b and 235b. The inclined surfaces 233a and 235b may be formed so that the light incident thereon is totally-reflected. In particular, the inclined surfaces 233a and 235b may incline at a slope at which the light incident thereon and the light reflected thereby are perpendicular to each other.

The plurality of second light dividing units 233 are formed at positions which are further along the path of the incident light (i.e. further from the beam shapers 220, 221, and 222) than the corresponding plurality of first light dividing units 231, by the horizontal length h of the inclined surface 231a. The horizontal length of the inclined surface 233a is the horizontal length h of the inclined surface 231a of the first light dividing unit 231. The length of each of the flat surfaces 233b is twice as long as the horizontal length h of each of the inclined surfaces 231a of the first light dividing unit 231.

The plurality of third light dividing units 235 are formed at positions which are further along the path of the incident light (i.e. further from the beam shapers 220, 221, and 222) than the plurality of second light dividing units 233, by the horizontal length h of the inclined surfaces 233a of the second light dividing unit 233. The horizontal length of each of the inclined surfaces 235a is the horizontal length h of each of the inclined surfaces 231a of the first light dividing unit 231. The length of each of the flat surfaces 235b is twice as long as the horizontal length h of each of the inclined surfaces 231a of the first light dividing unit 231.

The lighting device 200 sequentially emits red, green and blue light beam groups, in a repeating pattern. A red light beam group emitted from the first light source 210 is incident on the first beam shaper 220, which emits parallel red light having a predetermined cross-sectional shape. The path of the red light incident on the first light dividing member 230 is changed by the inclined surfaces 231a of the first light dividing unit 231. The light is divided to a plurality of red light beam groups to having an interval therebetween corresponding to the length of each of the flat surfaces 231b. The plurality of red light beam groups are the directed toward the second light dividing member 232. Since the length d of each of the flat surfaces 231b is twice as long as the horizontal length h of each of the inclined surfaces 231a, a width of each light beam group is h, and an interval between each light beam group is 2 h. Since the plurality of red light beam groups are perpendicularly incident on the flat surfaces 233b of the second light dividing unit 233, they are transmitted by the second light dividing member 232 without being refracted.

A green light beam group, emitted from the second light source 211, is incident on the second beam shaper 221 and emitted therefrom as parallel green light having a predetermined cross-sectional shape. The green light incident on the second light dividing member 232 is then divided to a plurality of green light beam groups by the second light dividing units 233. That is, the green light beam group is reflected by the inclined surfaces 233a, and is divided into a plurality of green light beam groups having widths corresponding to the length of the flat surfaces 231b. The plurality of green light beam groups G are then directed toward the third light dividing member 234. Since the red light beam group, which is emitted from the first light dividing member 230 and transmitted through the second light dividing member 232, and the green light beam group emitted from the second light dividing member 231 are perpendicularly incident on the flat surfaces 235b of the third light dividing unit 235, they are transmitted by the third light dividing member 234 without being refracted.

A blue light beam group emitted from the third light source 212 is incident on the third beam shaper 232, and is emitted therefrom as parallel light having a predetermined cross-sectional shape. The emitted blue light beam group is incident on the third light dividing member 234, and is thereby divided into a plurality of blue light beam groups B by the third light dividing units 235. That is, the blue light beam group B is reflected by the inclined surfaces 235a, and the plurality of blue light beam group is thereby divided into a plurality of blue light beam groups each having a width corresponding to a length of each of the flat surface 235b. The plurality of blue light beam groups are then emitted from the third light dividing member 234.

Figure 4:
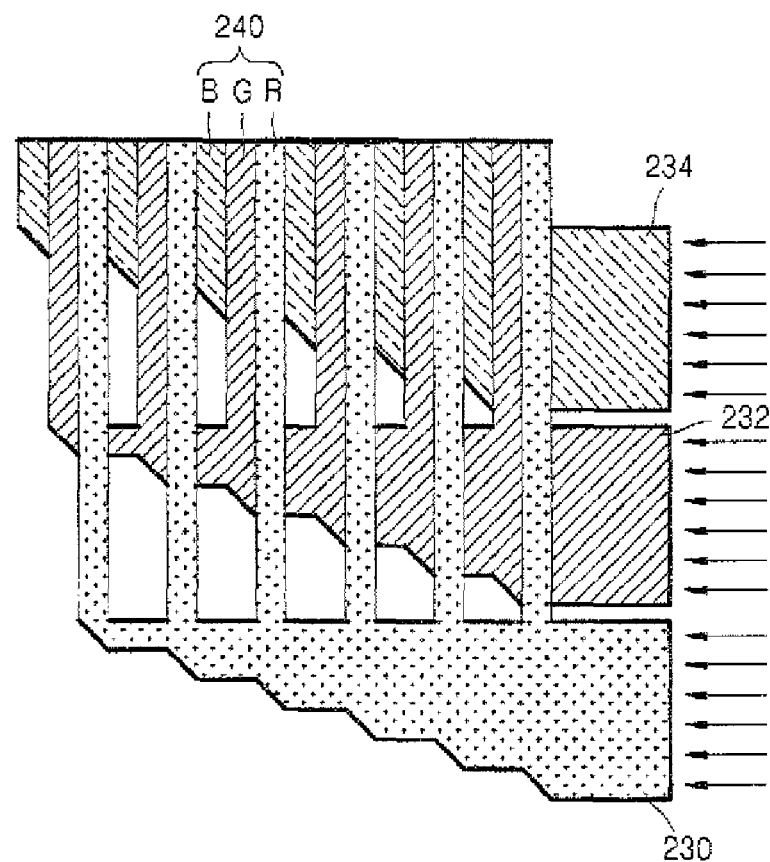
FIG. 4 is a view illustrating a plurality of red, green, and blue light beams emitted from the lighting device of FIG. 3.

As illustrated in FIG. 4, the light emitted from the third light dividing member 234 comprises a plurality of sets 240 of red, green, and blue light beams, in which the red light beam groups, the green light beam groups, and the blue light beam groups are form a sequential, repeating pattern. The number of the sets 240 of red, green, and blue light beams is determined according to the number of inclined surfaces 231a, 233a and 235a of the first, second and third light dividing units 231, 233 and 235.

Figure 5:
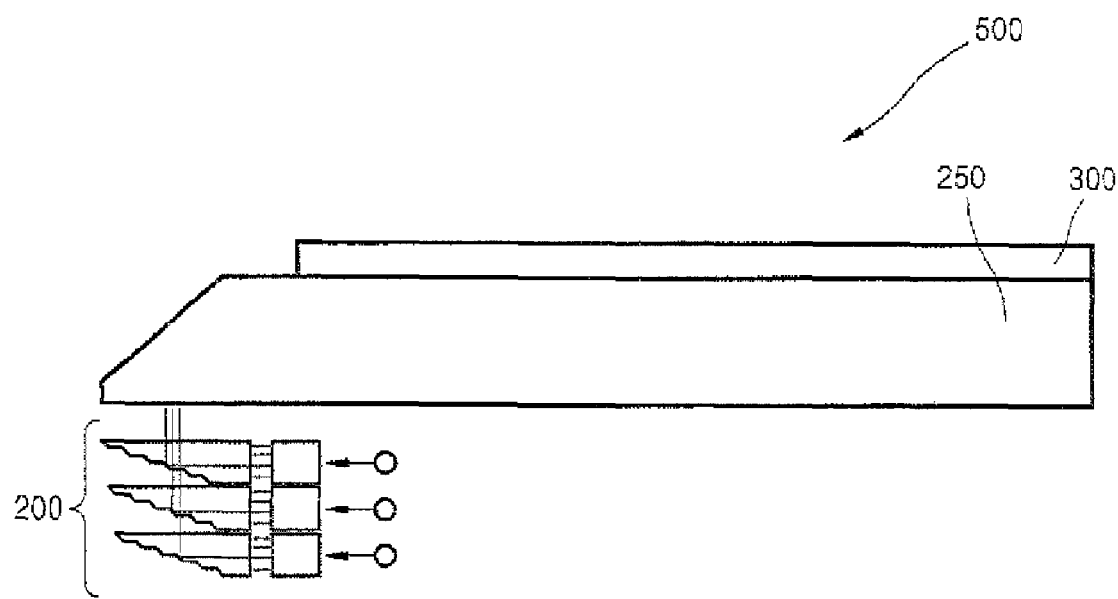
FIG. 5 is a cross sectional schematic view illustrating a display device according to an exemplary embodiment of the present invention.
Figure 6:
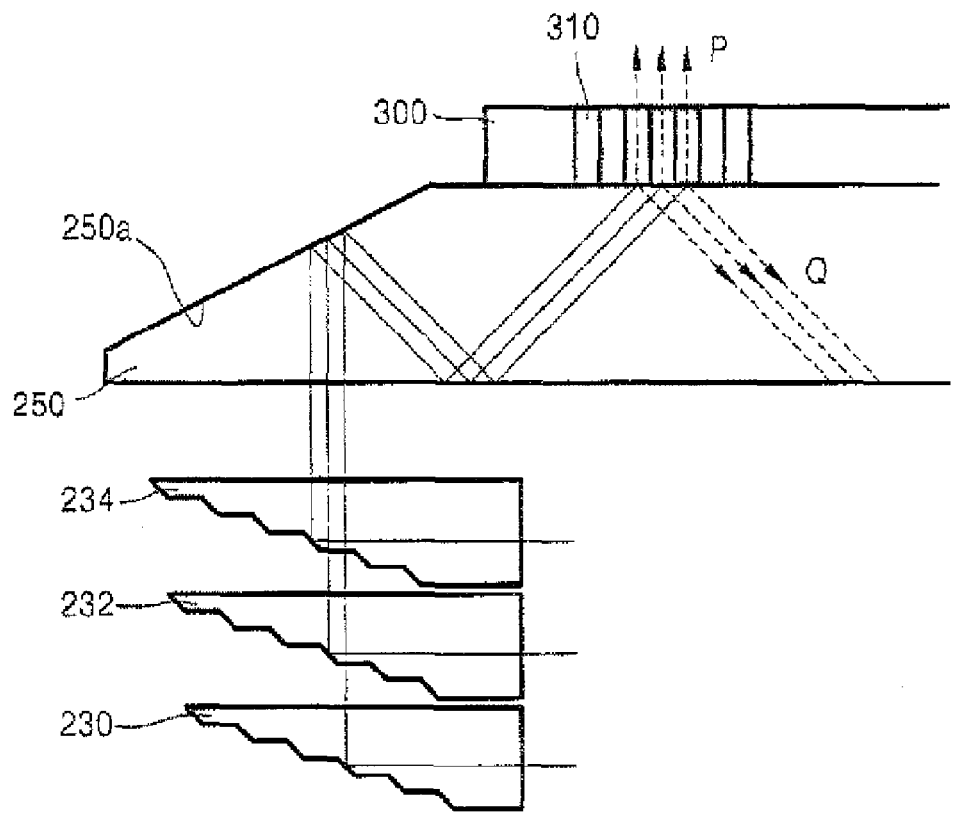
FIG. 6 is an enlarged view of the display device of FIG. 5.

FIG. 5 is a cross-sectional schematic view illustrating a display device 500 according to an embodiment of the present invention. FIG. 6 is an enlarged view of a section of the display device 500 of FIG. 5. Referring to FIGS. 5 and 6, the display device 500 includes a lighting device 200, a light guide plate 250 and an optical modulator 300.

The lighting device 200 shown in FIG. 5 is equivalent to the lighting device 200, as described above with respect to FIGS. 3 and 4, and thus a detailed description of the lighting device 200 will be omitted.

The light guide plate 250 is disposed adjacent to the lighting device 200, and it guides the light emitted from the lighting device 200. To achieve this, the light guide plate 250 includes a reflective surface 250a, reflecting the light emitted from the lighting device 200 toward a lower part of the light guide plate 250. The reflective surface 250a may incline at a slope at which the light incident thereon is totally-reflected toward a lower surface of the light guide plate 250. Thus, the light emitted from the lighting device 200 is totally-reflected at the upper and lower surfaces of the light guide plate 250, and it passes through the inside of the light guide plate 250.

The optical modulator 300 is disposed on the light guide plate 250, and it controls light transmission per pixel so that light passing through the inside of the light guide plate 250 may be transmitted from an upper part of the light guide plate 250 to the optical modulator 300 or may be totally-reflected to a lower part of the light guide plate 250. To achieve this, the optical modulator 300 includes a plurality of cells 310 each corresponding to a single pixel. Each cell 310 includes materials by which light is totally-reflected or transmitted according to an electrical signal. When the cells 310 have a transmitting mode on, the light is transmitted from an upper part of the optical modulator 300 in a P direction rather than being totally-reflected. When the cells 310 have a total-reflection mode on, the light is reflected towards a lower surface of the light guide plate 250 in a Q direction.

For example, the cells 310 may comprise electrowetting light valve cells, or alternatively, may comprise polymer cells, each including a thin film polymer of which surface patterns are altered according to applied voltages.

Figure 7A:
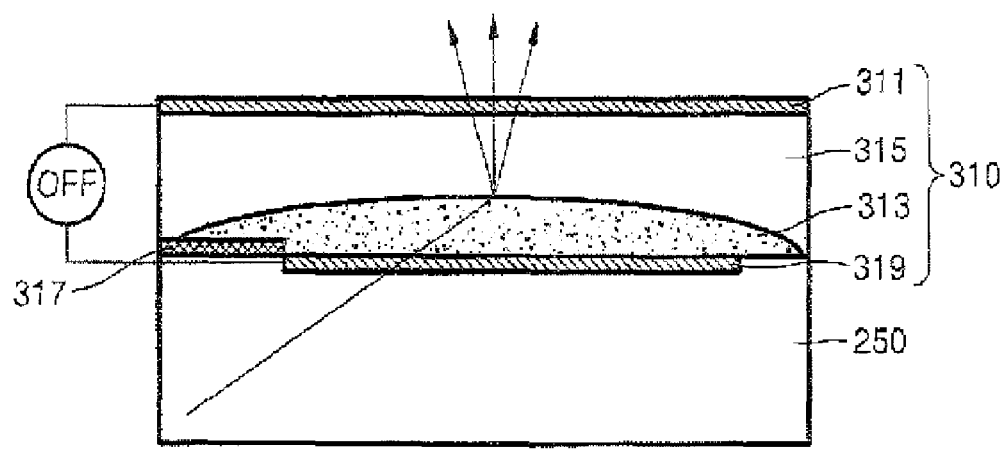
FIGS. 7A and 7B are cross-sectional views respectively illustrating a transmit mode and a total-reflection mode in which a cell is an electrowetting light valve cell according to an exemplary embodiment of the present invention.
Figure 7B:
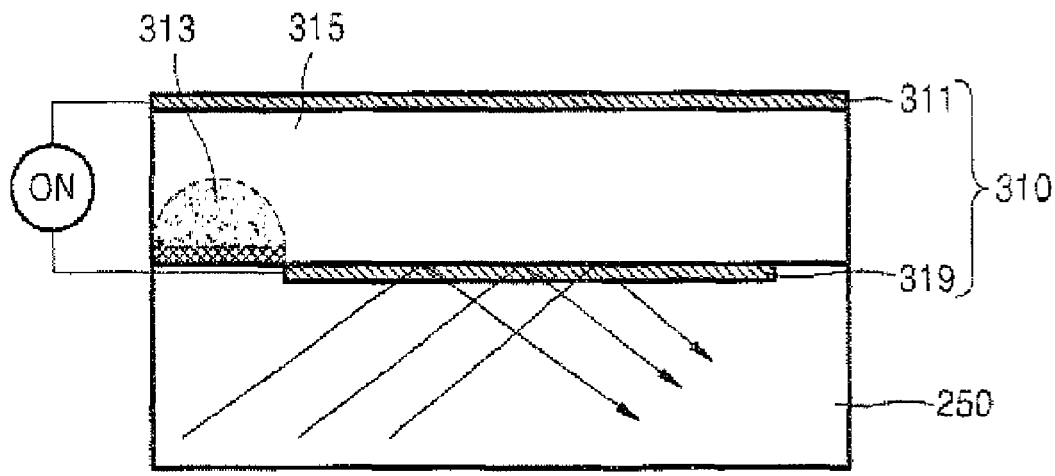

FIGS. 7A and 7B are cross-sectional views respectively illustrating a transmit mode and a total-reflection mode where the cell 310 is an electrowetting light valve cell according to an embodiment of the present invention. Referring to FIGS. 7A and 7B, electrowetting light valve cell 310 includes an upper electrode 311 and a lower electrode 319. A first material 313 having a refractive index of n1 and a second material 315 having a refractive index of n2 fill between the upper electrode 311 and a lower electrode 319. A grid 317 is disposed on one side part of the electrowetting light valve cell 310. FIG. 7A illustrates the case where a voltage is not applied between the upper electrode 311 and the lower electrode 319. Referring to FIG. 7A, the first material 313 is disposed on a lower side part of the electrowetting light valve cell 310. Here, since the refractive index $n_1$ of the first material 313 is greater than the refractive index $n_3$ of a light guide plate 250, light is transmitted from an upper part of the electrowetting light valve cell 310 without being totally-reflected. FIG. 7B illustrates the case where a voltage is applied between the upper electrode 311 and the lower electrode 319. Referring to FIG. 7B, when the voltage is applied between the upper electrode 311 and the lower electrode 319, the first material 313 is moved onto the grid 317, and then a boundary between the second material 315 and the light guide plate 250 is formed at a lower part of the electrowetting light valve cell 310. Since the refractive index $n_2$ of the second material 315 is smaller than the refractive index $n_3$ of the light guide plate 250, light is totally-reflected toward a lower part of the light guide plate 250.

Figure 8A:
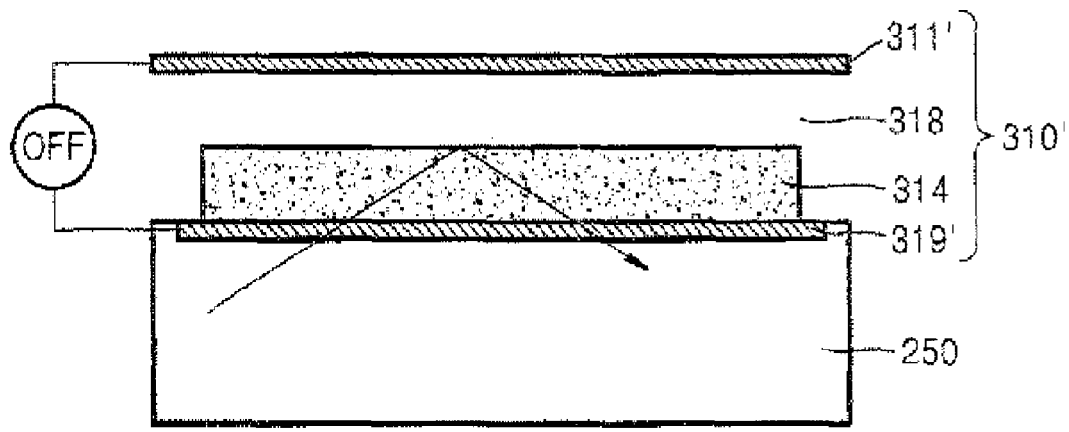
FIGS. 8A and 8B are cross-sectional views respectively illustrating a total-reflection mode and a transmit mode in which a cell is a polymer cell according to another exemplary embodiment of the present invention.
Figure 8B:
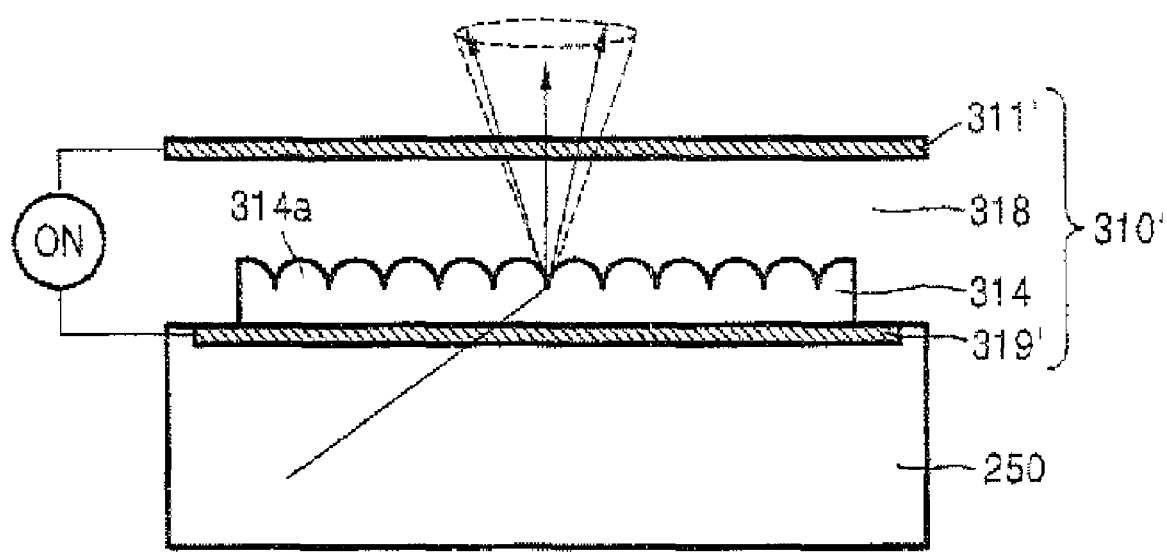

FIGS. 8A and 8B are cross-sectional views respectively illustrating a total-reflection mode and a transmit mode where the cell 310 is a polymer cell according to another embodiment of the present invention. Referring to FIGS. 8A and 8B, a polymer cell 310' includes an upper electrode 311', a lower electrode 319', a thin film polymer 314 disposed between the upper electrode 311' and the lower electrode 319', and an air layer 318. FIG. 8A illustrates the case where a voltage is not applied between the upper electrode 311' and the lower electrode 319'. Referring to FIG. 8A, a surface of the thin film polymer 314 has no pattern. Since the refractive index of the thin film polymer 314 is equal or similar to that of a light guide plate 250, and it is greater than refractive index of the air layer 318, light is totally reflected from a surface of the thin film polymer 314 toward a lower part of the light guide plate 250. This is the case of a total-reflection mode (off-mode). FIG. 8B illustrates the case when a voltage is applied between the upper electrode 311' and the lower electrode 319'. Referring to FIG. 8B, a diffusing pattern 314a is formed on a surface of the thin film polymer 314. Thus, light is diffracted or scattered to an upper part of the polymer cell 310'. This is the case of a transmitting mode (on-mode). Since Publication Patent No. WO04/023197 (method and device for variable attenuator), incorporated herein by reference, discloses the above mentioned thin film polymer, a detailed description of the thin film polymer will be omitted.

The optical modulator 300 is scanned and driven to have on/off modes to form an image and a scanning unit comprises a pixel region corresponding to the plurality of red, green, and blue light beam sets emitted from the lighting device 200.

According to an exemplary embodiment of the invention, light may be emitted according to scanning stages of an optical modulator, and a first, a second, a third, and an Nth module may be scanned, respectively.

Figure 9:
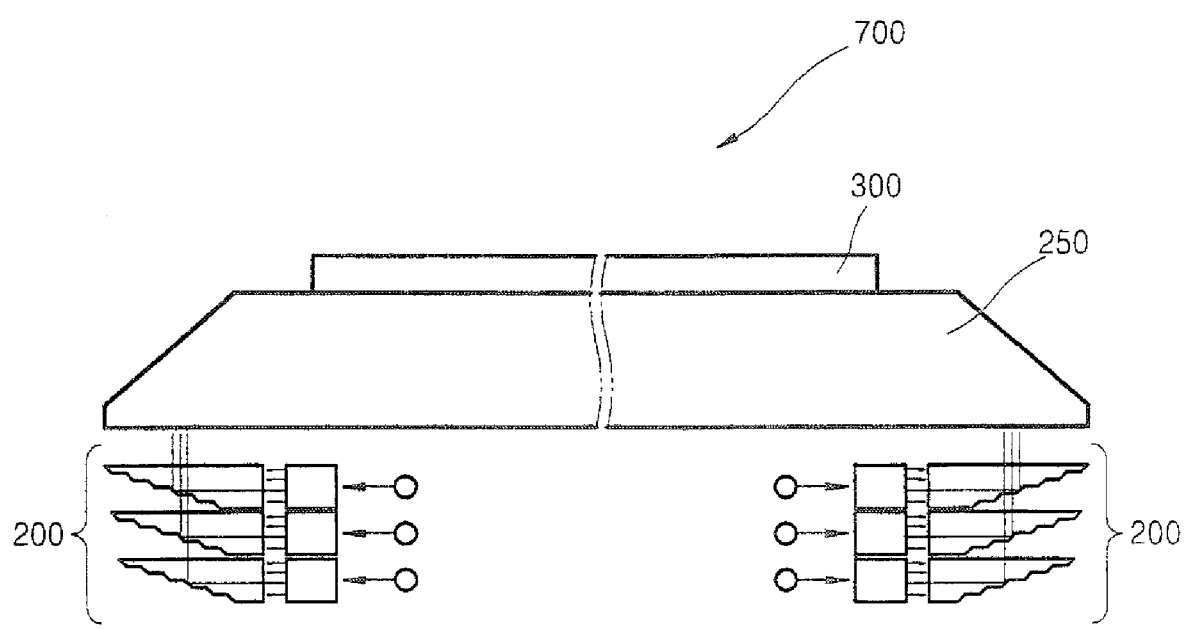
FIG. 9 is a cross-sectional schematic view illustrating a display device according to another exemplary embodiment of the present invention.

FIG. 9 is a cross-sectional schematic view illustrating a display device 700 according to another embodiment of the present invention. Construction of the display device 700 is the same as that of the display device 500 of FIG. 5 except that lighting devices 200 are formed on both lower side parts of a light guide plate 250. Thus, the display device 700 can be driven with a relatively quick scanning.

A lighting device according to the present invention employs a light dividing member by which light is divided to a plurality of light beam groups and is emitted. Thus, the lighting device according to the present invention emits red, green, and blue light beam sets corresponding to pixel regions.

Accordingly, a display device employing the lighting device according to another embodiment of the present invention needs no additional color filters. It has good brightness properties, and it can be driven at a low power. In addition, the display device includes a light guide plate and a light modulator which may be integrally formed on the light guide plate, and can be controlled to totally reflect or transmitting light, and thus it can be manufactured to have a thin structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lighting device comprising:
   first, second, and third light sources which each emit monochromatic light in the same direction, wherein the light emitted from the first, second, and third light sources are different colors;
   first, second, and third beam shapers corresponding to the first, second, and third light sources, respectively, wherein light from the first, second, and third light sources are incident, respectively, on the first, second and third, beam shapers, and light emitted from the first, second, and third beam shapers is parallel and has a predetermined cross-sectional shape; and
   first, second, and third light dividing members, each comprising a light receiving surface corresponding to the cross-sectional shape of the light emitted from the first, second, and third beam shapers, wherein each of the light dividing members divides the monochromatic light incident thereon into a plurality of monochromatic light beam groups which are parallel to each other and have a predetermined width and interval therebetween,
   wherein the plurality of monochromatic beam groups emitted from the first light dividing member are parallel to the plurality of monochromatic beam groups emitted from the second and third light dividing members such that the plurality of monochromatic light beam groups emitted from all of the light dividing members are emitted in a spatially alternating, repeating pattern.

2. A lighting device comprising:

first, second, and third light sources which each emit monochromatic light in the same direction, wherein the light emitted from the first, second, and third light sources are different colors;

first, second, and third beam shapers corresponding to the first, second, and third light sources, respectively, wherein light from the first, second, and third light sources are incident, respectively, on the first, second and third, beam shapers, and light emitted from the first, second, and third beam shapers is parallel and has a predetermined cross-sectional shape; and first, second, and third light dividing members, each comprising a light receiving surface corresponding to the cross-sectional shape of the light emitted from the first, second, and third beam shapers, wherein each of the light dividing members divides the monochromatic light incident thereon into a plurality of monochromatic light beam groups each having a predetermined width and interval therebetween, wherein the plurality of monochromatic beam groups of the light dividing members are emitted from the light dividing members in an alternating, repeating pattern, wherein each light dividing member comprises a plurality of light dividing units, each light dividing unit comprising an inclined surface, which reflects light incident thereon, and a flat surface, which is parallel with the parallel light emitted from the beam shapers, wherein the plurality of light dividing units together form a stepped shape, and wherein light reflected by an inclined surface of the first light dividing member is transmitted to a flat surface of the second light dividing member and a flat surface of the third light dividing member, and light reflected by an inclined surface of the second light dividing member is transmitted to a flat surface of the third light dividing member.

3. The lighting device of claim 2, wherein the plurality of light dividing units of the second light dividing member are disposed at positions which are further from the beam shapers than corresponding light dividing units of the first light dividing member by a horizontal length which is a projected length of an inclined surface onto a surface parallel to a flat surface, and the plurality of light dividing units of the third light dividing member are disposed at positions which are further from the beam shapers than corresponding light dividing units of the second light dividing units by the horizontal length.

4. The lighting device of claim 2, wherein a length of each flat surface of each of the light dividing units of each of the light dividing members is twice as long as a horizontal length which is a projected length of an inclined surface on a surface parallel to a flat surface.

5. The lighting device of claim 2, wherein each inclined surface has a slope such that light incident thereon is totally reflected.

6. The lighting device of claim 5, wherein each inclined surface has a slope such that light incident thereon and light reflected thereby are perpendicular to each other.

7. A display device comprising:

a lighting device comprising:

first, second, and third light sources which each emit monochromatic light in the same direction, wherein the light emitted form the first, second, and third light sources are different colors;

first, second, and third beam shapers corresponding to the first, second, and third light sources, respectively, wherein light from the first, second, and third light sources are incident, respectively, on the first, second, and third beam shapers, and light emitted form the beam shapers is parallel and has a predetermined cross-sectional shape; and first, second, and third light dividing members, each comprising a light receiving surface corresponding the cross-sectional shape of the light emitted from the first, second, and third beam shapers, wherein each of the light dividing members divides the monochromatic light incident thereon into a plurality of monochromatic light beam groups which are parallel to each other and have a predetermined width and interval therebetween;

wherein the plurality of monochromatic beam groups emitted from the first light dividing member are parallel to the plurality of monochromatic beam groups emitted from the second and third light dividing members such that the plurality of monochromatic light beam groups emitted from all of the light dividing members are emitted in a spatially alternating, repeating pattern;

a light guide plate, which guides light emitted from the lighting device; and a light modulator disposed on the light guide plate and controlled per pixel such that light passing through an inside of the light guide plate is transmitted from an upper part of the light guide plate through the light modulator or is totally reflected toward a lower part of the light guide plate.

8. The display device of claim 7, wherein each light dividing member comprises a plurality of light dividing units each light dividing unit comprising an inclined surface, which reflects light incident thereon, and a flat surface, which is parallel with the parallel light emitted from the beam shapers, wherein the plurality of light dividing units together form a stepped shape;

wherein light reflected by an inclined surface of the first light dividing member is transmitted to a flat surface of the second light dividing member and to a flat surface of the third light dividing member, and wherein light reflected by an inclined surface of the second light dividing member is transmitted to a flat surface of the third light dividing member.

9. The display device of claim 8, wherein the plurality of light dividing units of the second light dividing member are disposed at positions which are further from the beam shapers than corresponding light dividing units of the first light dividing member by a horizontal length which is a projected length of an inclined surface onto a surface parallel to a flat surface, and the plurality of light dividing units of the third light dividing member are disposed at positions which are further from the beam shapers than corresponding light dividing units of the second light dividing units by the horizontal length.

10. The display device of claim 9, wherein a length of each flat surface of each light dividing unit of each of the light dividing members is twice as long as the horizontal length which is a projected length of an inclined surface on a surface parallel to a flat surface.

11. The display device of claim 8, wherein each inclined surface has a slope such that light incident thereon is totally reflected.

12. The display device of claim 11, wherein each inclined surface has a slope such that light incident thereon and light reflected thereby are perpendicular to each other.

13. The display device of claim 7, wherein the light guide plate comprises a reflective surface which alters a path of light incident thereon from the lighting device, such that the light is directed towards a lower surface of the light guide plate.

14. The display device of claim 13, wherein the reflective surface totally reflects light incident thereon, from the lighting device, toward a lower surface of the light guide plate.

15. The display device of claim 7, wherein the light modulator comprises a plurality of electrowetting light valve cells each corresponding to a pixel.

16. The display device of claim 7, wherein the light modulator comprises a plurality of thin film polymer, wherein a surface pattern of the thin file polymer changes according to applied voltages, and wherein each thin film polymer corresponds to a pixel.

17. The display device of claim 7, wherein the light modulator is scanned and a scanning unit corresponds to a pixel region corresponding to the plurality of light beam groups emitted from the lighting device.

* * * * *